E. A. NELSON.
FOCUSING DEVICE FOR MOVING PICTURE MACHINES.
APPLICATION FILED JAN. 8, 1918.
1,271,748.
Patented July 9, 1918.
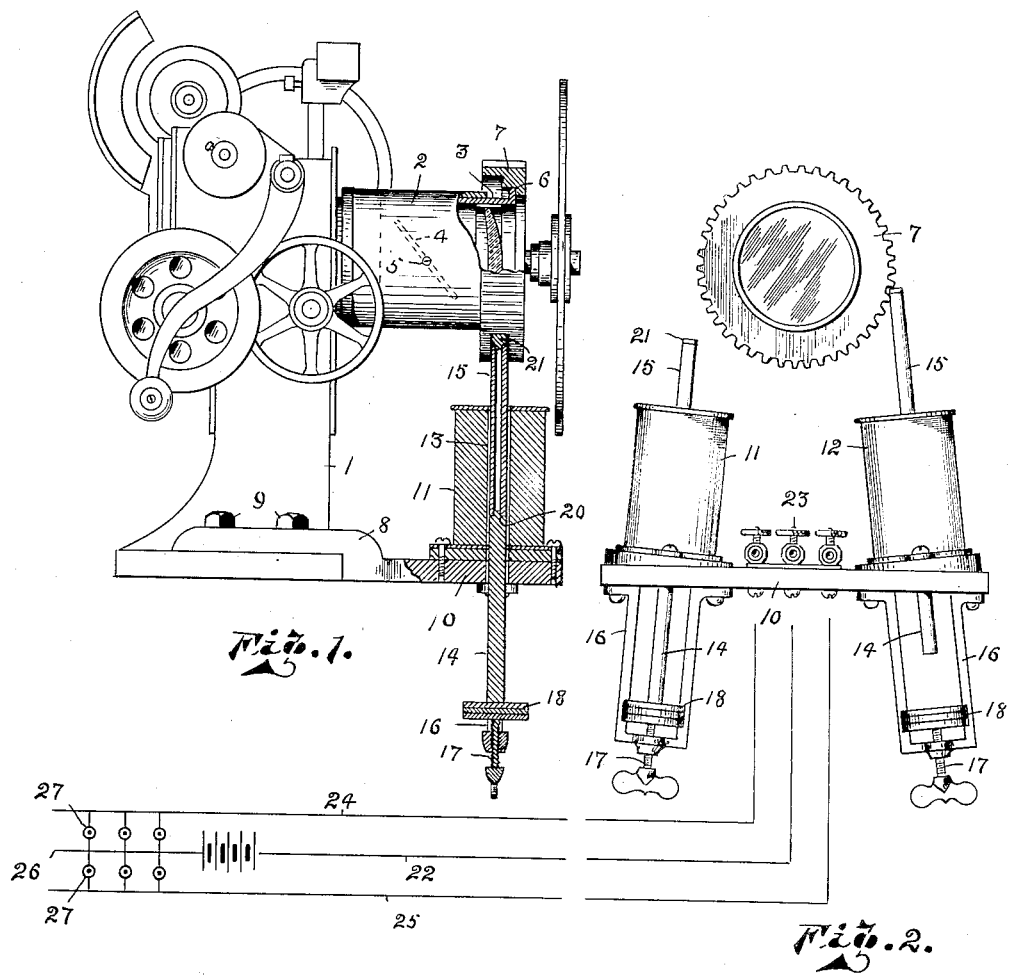
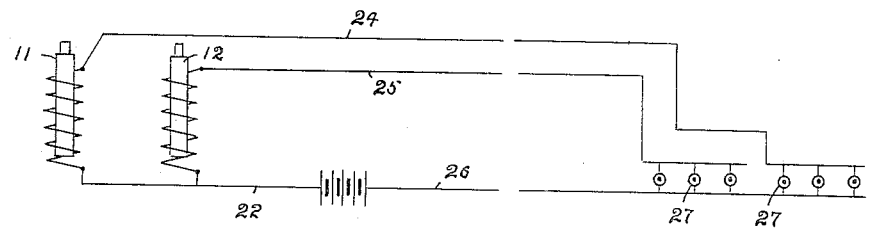
Inventor
Emil A. Nelson
By Geo. Stevens.
Attorney

UNITED STATES PATENT OFFICE.

EMIL A. NELSON, OF DULUTH, MINNESOTA.

FOCUSING DEVICE FOR MOVING-PICTURE MACHINES.

1,271,748. Specification of Letters Patent. Patented July 9, 1918.

Application filed January 8, 1918. Serial No. 210,899.

*To all whom it may concern:*

Be it known that I, EMIL A. NELSON, a citizen of the United States, residing at Duluth, in the county of St. Louis and State of Minnesota, have invented certain new and useful Improvements in Focusing Devices for Moving-Picture Machines, of which the following is a specification, reference being had therein to the accompanying drawing.

This invention relates to focusing devices for moving picture machines and has special reference to novel means whereby a picture projected from such a machine may be focused from one or more locations remote from the machine or adjacent thereto.

Heretofore it has been the custom to adjust the projection lens of a motion picture machine directly by hand and while it is a well recognized fact that the operator at the machine is not in the best position in relation to the screen upon which the picture is projected, for focusing same, no method to my knowledge has been successfully employed to improve such conditions.

The practice of using field or opera glasses by the operator for determining the sharpness of a picture is frequently resorted to but which is not satisfactory and is not generally considered practical. Again in some large picture houses a bell signal system is resorted to and wherein an electric circuit is installed having a push button on or near the stage and bell in the operating room by which with prearranged signals a person at the push button may advise the operator as to the conditions of the picture and in which direction to move the lens for correct focusing. By actual practice in my own theater, I have determined that the best distance from which to view the ordinary projected picture for proper focusing is approximately fourteen feet from the screen and as nearly as possible at an elevation in line with the center of the field of vision of the audience.

The primary object of my present invention is to provide means whereby easier and more accurate focusing of a picture as above referred to, may be accomplished.

Another object is to provide such means in the operation of which it is not necessary to annoy the operator of the machine that his undivided attention may be given to the machines and which is essential for best results.

Still another object is to provide such means whereby a picture may be focused from any desired place where it becomes possible or practical to do so.

These and other advantages will become evident in the further description of the invention.

In the accompanying drawings forming part of this application and in which like reference characters indicate like parts:

Figure 1, represents a side elevation of what is known as a Power's moving picture machine, and showing a portion of the focusing lens and operating device in section.

Fig. 2, is a front elevation of the lens and operating device, including the electrical connections, Fig. 3, is a diagrammatic view of the electric circuit and controlling system, and Fig. 4, is a plan view of the disks used in regulating the throw of the solenoid cores and cushioning same.

1, represents the Power's head which has horizontally projecting from the front thereof the jacket or tube 2 in which the lens barrel 3 is reciprocally carried, and which barrel is reciprocated when rotary motion is imparted thereto, it having a diagonally disposed slot indicated at 4 formed therein and within which slot extends a screw 5, it being rigidly held in the tube 2. All of this construction is common in the art and forms no part of my present invention.

It is customary to rotate the lens barrel 3 by hand for focusing the picture projected from the machine and for which purpose a circumferential milled bead 6 is usually formed upon the outer surface of the lens barrel. The present invention relates to means other than manual for accomplishing such rotation and still permit of the lens being adjusted by hand when desired.

It is known to be essential that the lens carrying barrel must fit reasonably snug within its supporting jacket or tube 2 in order to remain in any position to which it is adjusted and not be affected by the vibration of the machine when in operation, and thus obviate the necessity of its being otherwise held in any adjusted position.

In the embodiment of my invention here illustrated I have provided a ring gear 7 which is made of a size to fit tightly over the milled bead 6 and there secured in any desired manner and by which the lens barrel may be rotated either manually or mechanically, there being no mechanism whatever permanently connected with the gear.

From the base of the head 1, and attached thereto in any desired manner and as a preferred form of construction is a forwardly extending bracket 8 illustrated as attached to the head by suitable bolts 9, and, which may be thus attached to either one or both sides of the body portion of the head. The outer extremity of the bracket is in the form of a shelf 10 upon which are securely fastened two solenoids 11 and 12, they each having an axial bore 13 therethrough.

In each bore is a reciprocal loosely fitting core composed of two sections 14 and 15, the combined length of which is substantially twice the length of one of the solenoids. The lowermost section 14 of each core is of soft iron susceptible of energization by the magnetic influence of the solenoids and the upper section 15 is hollow for lightness and of brass or like unsusceptible material.

A hole is formed through the shelf 10 under each solenoid registering with the axial bore 13 and through which the cores of the solenoids play.

Each core is normally supported by a depending U-shaped bracket 16 fastened to the under side of the shelf 10 and carrying in its lowermost extremity an adjusting thumb screw 17 which supports a plurality of disks 18 made vertically slidable within the bracket by having loose fitting notches 19—19 formed in the edges thereof and in which notches the sides of the bracket coöperatively extend. The lower one of the disks 18 is made of metal and acts as a support for the ones above it which latter are of resilient material such as hard rubber or the like to cushion the return blow of the core as it strikes same.

One or more of these resilient washers may be employed for varying the relative longitudinal position of the core to its respective solenoid and the finer adjustment of length of stroke of the core accomplished by the thumb screws 17. The two sections 14 and 15 of the cores are permanently united either by soldering or other desired means as illustrated at 20, and the upper end of the section 15 is provided with a cap or plug 21 of a harder metal than the brass tube to successfully withstand repeated striking against the cogs of the ring gear 7. When inactive the iron section 14 of each core extends somewhat within the solenoid so as to respond readily to the influence of the coils when energized.

I have found in practice that for best results and the most desirable engagement of the cogs on the ring gear by the solenoid cores, the solenoids should be set at an angle upon the shelf 10, they slightly converging upwardly therefrom so that each core when thrust upwardly will strike a cog of the ring gear 7 just below a horizontal diametrical line through the gear and which impact is designed to usually move the gear but a small fraction of one revolution as it is well known that but a slight movement back or forth of the lens may result in correct or incorrect focusing.

Another object of inclining the solenoids is to improve the engagement of the cores with the cogs as by so doing the cores strike the cogs a fairer blow, and in forcing the gear to rotate it is apparent that the cog next following the one engaged will contact the side of the core adjacent the end thereof.

Now were it not for the fact that the axial hole 13 in the solenoid is made somewhat larger than required for an easy fit of the core the latter would become bound in the solenoid by the lateral action of the following cog above mentioned. However, the bore is made just sufficiently large to overcome this trouble and due to the fact that the core as soon as energized assumes a central position in the bore and holds same throughout its active stroke the operation is perfectly satisfactory.

By this means the lens carrying barrel with the gear is rotated step by step with each upward thrust of one of the cores and simultaneously moved in or out due to the slot 4 and screw 5 arrangement referred to and thus the desired movement of the lens for focusing accomplished. The ring gear 7 is made of the proper thickness or length of face to move the limit either one way or the other and still remain in line with the engaging cores.

It is obvious that but one solenoid is operated at a time and for such operation I have illustrated a three wire electric circuit comprising the neutral wire 22 leading from one pole of the source of electric supply to the central contact 23 and to which one wire of each solenoid winding is attached; and the two individual wires 24 and 25 which parallel the wire 26 leading from the opposite pole of the source of electric supply and connect each to its respective solenoid winding, 27 represents push-buttons in each circuit thus established which may be located in pairs (one in each circuit) at as many places in the theater desired for convenience and accessibility of one or more persons having charge of the focusing of the picture.

By this arrangement it is evident that having access to a pair of these circuit controlling buttons and the apparatus properly connected for operation, that in closing either one of the circuits by operating the push-buttons therein the corresponding solenoid will function and the lens barrel be rotated accordingly. If such rotation is found to be in the wrong direction, by pushing the other button of the pair, the opposite solenoid will become active and result in the lens barrel being rotated in the opposite direction thus giving perfect focusing control.

It is also evident that by quick successive pushing of either one of the buttons the lens barrel may be moved accordingly any desired distance within the limits of its motion.

It is to be understood that various modifications in construction and arrangement of parts of the invention and within the scope thereof may be resorted to without departing from the spirit of the invention.

Having thus described the invention, what I claim as new and desire to secure by Letters Patent, is—

1. An operating device for focusing lenses, comprising a reciprocable lens having a ring gear thereabout, a substantially vertically disposed solenoid adjacent the gear, a core within the solenoid having an extension upon the upper end thereof engageable with the teeth of the gear whereby when the solenoid is energized, the end of the extension will strike one tooth of the gear, and correspondingly rotate same, an electric circuit for supplying energy to the solenoid and means in the circuit for intermittently making and breaking same.

2. An operating device for reciprocable focusing lenses, comprising a ring gear fixed about the lens, a pair of solenoids, one on each side of the gear and below same, a fabricated reciprocal core in each solenoid alined with the extreme outer tooth of the gear directly above it whereby when each solenoid is energized the extension upon its respective core will forcibly strike said tooth and correspondingly revolve the gear and means for alternately intermittently energizing the solenoids.

3. In a device of the character described, the combination with a reciprocable focusing lens having a ring-gear rigidly fixed thereto, of reciprocal electrically controlled means adjacent the gear and coöperatively engageable therewith and an electric circuit connected therewith having means therein for intermittently energizing the controlling means.

In testimony whereof I hereunto affix my signature in the presence of two witnesses.

EMIL A. NELSON.

Witnesses:
W. H. DENHAM,
S. GEO. STEVENS.